March 9, 1937.  S. M. BLACKBURN ET AL  2,072,846
SLICING MACHINE
Filed June 20, 1933  2 Sheets-Sheet 1
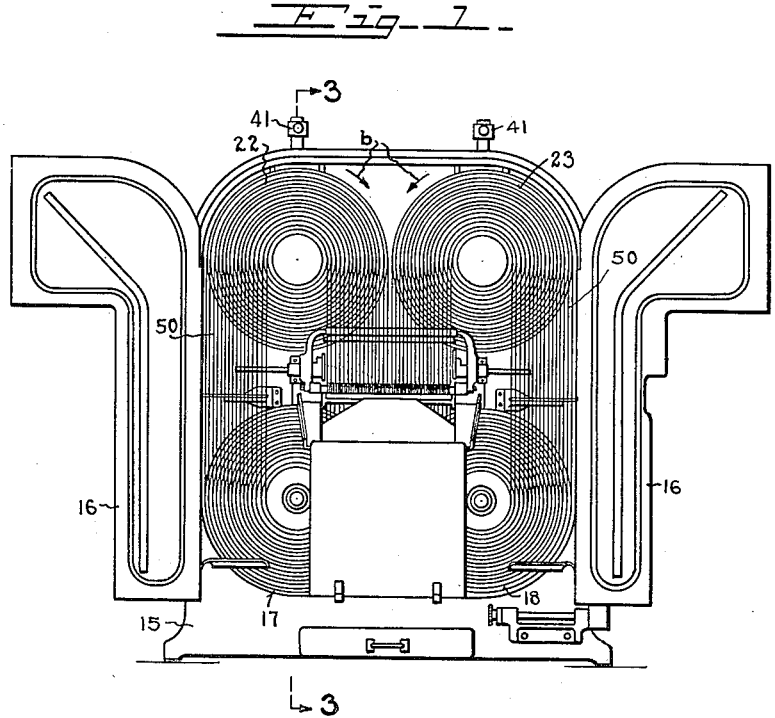
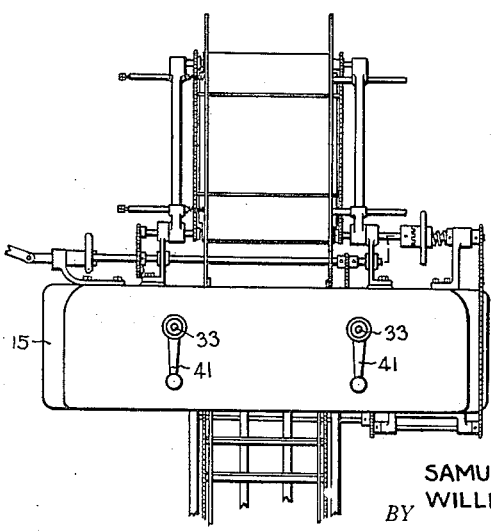
INVENTORS.
SAMUEL M. BLACKBURN &
BY  WILLIAM L. SCHELLENBACH
*H.C. Karel*
ATTORNEY.

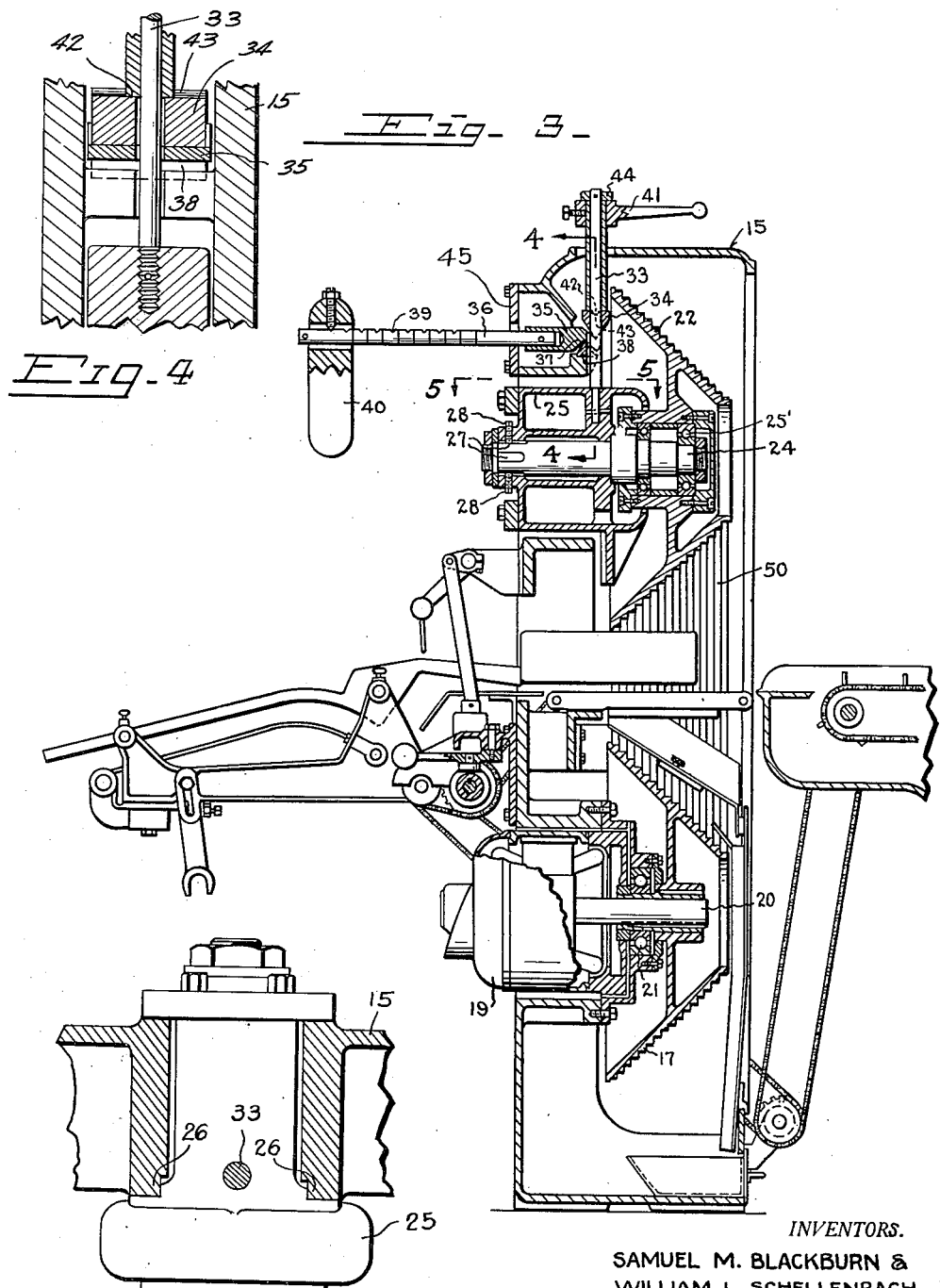

Patented Mar. 9, 1937

2,072,846

UNITED STATES PATENT OFFICE 2,072,846

SLICING MACHINE

Samuel M. Blackburn and William L. Schellenbach, Wyoming, Ohio, assignors to The Fay-Egan Manufacturing Company, Cincinnati, Ohio, a corporation of Ohio Application June 20, 1933, Serial No. 676,691

3 Claims. (Cl. 143—27)

Our invention relates to a new and improved slicing machine and more particularly to a machine for slicing bread and other comparatively soft bakery products.

We are aware that various types of slicing machines have been devised, some of which have reciprocating blades or saws that cut on the down stroke or the up stroke or both. Machines of this type create a great deal of friction on the product being sliced, causing excessive crumbs and depression of the product.

In our improved machine the arrangement of the saws is such as to slice the product with a minimum amount of friction, thereby reducing the crumbs to a minimum and delivering the loaf in a clean and unburnt condition with clean cut edges. We have also overcome the tendency of most machines to break the crust edges of the bread and bread sliced on our machine has a crust edge of a razor-like sharpness.

The object of our invention is to provide continuous rotating knives or saws arranged in a V-shaped formation for slicing a loaf of bread with adjacent saws entering the bread in step relation.

A further object is to provide means for creating a positive tension on the saws, regardless of the number of saws used. A further object is to provide means for releasing the tension on the saws when it is desired to replace or remove a given saw.

Our invention will be further readily understood from the following description and claims, and from the drawings, in which latter:

Fig. 1 is a front view of our improved machine with doors open.

Fig. 2 is a plan view of the same.

Fig. 3 is a vertical cross-section of the machine, taken in the plane of the line 3—3 of Fig. 1.

Fig. 4 is a detail section, taken in the plane of the line 4—4 of Fig. 3; and

Fig. 5 is a detail section, taken in the plane of the line 5—5 of Fig. 3.

Our improved machine comprises a frame 15 provided with a pair of hinged doors 16 arranged to close a substantial portion of the machine. Mounted within the machine are two step cone band wheels 17, 18, driven directly by two shaftless motors, indicated at 19. The motor 19 is suitably mounted in the frame and drives a shaft 20 which runs in large oil-immersed ball bearings 21. The step cone band wheels are mounted on the shafts 20 and rotate directly from the motors. Arranged in a vertical plane with the step cone band wheels 17 and 18 are a pair of band wheels 22 and 23, suitably mounted on shafts 24 having ball bearings 25' interposed between the shaft and the step cone band wheel. The shafts 24 are suitably secured in adjustable housings 25 which are slidable in bearings 26 on the frame. (See Fig. 5). Means are also provided for truing the alignment of the shaft 24, by providing the end of the shaft 24 with reduced faces 27 and the hub of the housing 25 with set-screws 28 bearing against the faces 27 for aligning the shaft 24 and its band wheel in true running relation to the lower band wheel.

A rod 33 extends upwardly from the housing 25 being suitably pinned thereto, and has a V-block 34 received about the shaft and arranged to engage a V in a block 35 to which an extending rod 36 is attached. (See Figs. 3 and 4.) The block 35 has an additional V-groove 37 therein for engagement with a V-block 38 supported in the frame. The rod 36 has a plurality of grooves 39 thereon arranged to position an adjustable weight 40 along the rod. A lever 41 is received about the rod 33 and has a cam face 42 thereon coacting with a groove 43 in the V-block 34. A collar 44 pinned to the rod 33 maintains the cam lever on the rod. Thus the upper step-cone band wheels are supported by means of multiple V-blocks and tension on the wheels is obtained in ratios of one hundred pounds by shifting the weight 40 along the rod 36. While I have described the mounting and the tension support for the wheels 17 and 22, a similar construction is used on the wheels 18 and 23.

Band saws 50 are received about each vertical pair of step cone band wheels and one band is received over each step of the wheels. In the present exemplification there are sixteen bands on each pair of band wheels, although this number may be varied to suit different conditions. The bands used are regular saw blades with teeth having no set and each saw blade is braised together under tension and under micrometer measurements to exactly fit the step on the band wheel. Thus when tension is applied to the wheels, it is equally exerted on all sixteen of the band saws.

When it is desired to remove or replace a given band saw, the cam lever 41 is turned to cause the cam 42 to register with the groove 43 as shown in the drawings, to relieve the tension on the saws by permitting the rod 36 to rest on the housing plate 45, as shown in Fig. 3. When the cam 42 is registered with the groove 43, the block 34 is raised under pressure of block 35 and rod 36 comes to rest on the stop 45, and the rod, having come to the end of its counterclockwise travel, no longer exerts pressure on the block 34, thus allowing shaft 33 a slight downward movement due to the relative travel of cam 42 and block 34, thereby relieving the tension on the saws. In operating position the cam 42 is turned to ride out of the groove 43 for drawing up on the housing 25, thus placing the wheels with the saws thereabout in normal tension relation to each other.

Having thus fully described our invention, what we claim as new, and desire to secure by Letters Patent, is:

1. In a slicing machine, a frame, a pair of band wheels comprising an upper and a lower wheel, endless saws about said wheels, said upper wheel mounted on a bearing slidable in said frame, a fulcrum point on said frame, a fulcrum point extending from said bearing provided with a cam face, an extending rod having a contact with said fulcrum points being provided with a weight at its extending end for creating a tension between said wheels, a handle having a cam face co-acting with the cam face of said second named fulcrum turnable to relieve pressure on said saws and a stop for limiting the counterclockwise movement of said rod when pressure is relieved.

2. In a slicing machine, a frame, a pair of band wheels comprising an upper and a lower wheel, endless saws about said wheels, said upper wheel mounted on a bearing slidable in said frame, a fulcrum point on said frame, a fulcrum point extending from said bearing provided with a cam face, an extending rod having contact with said fulcrum points being provided with a weight at its extending end for creating a tension between said wheels, a handle having a cam face co-acting with the cam face of said second named fulcrum turnable to relieve pressure on said saws, a stop for limiting the counterclockwise movement of said rod when pressure is relieved, and said weight adjustable on said rod for varying the tension on said saws.

3. In a slicing machine, a frame, a pair of stepped cone band wheels comprising an upper and a lower wheel, endless saws about said wheels, motors mounted in said frame, said upper wheels mounted on bearings slidable in said frame, fulcrum points on said frame, fulcrum points extending from said bearing provided with cam faces, extending rods having contact with said fulcrum points being provided with weights at their extending ends for creating a tension between said wheels, handles having cam faces co-acting with the cam faces of said second named fulcrum turnable to relieve pressure on said saws and stops for limiting the counterclockwise movement of said rods when pressure is relieved.

SAMUEL M. BLACKBURN.
WILLIAM L. SCHELLENBACH.